Dec. 12, 1972 W. HILBERG 3,706,078

MEMORY STORAGE MATRIX WITH LINE INPUT AND COMPLEMENTARY DELAY AT OUTPUT

Filed Sept. 8, 1971 3 Sheets-Sheet 1

3,706,078

MEMORY STORAGE MATRIX WITH LINE INPUT AND COMPLEMENTARY DELAY AT OUTPUT

Wolfgang Hilberg, Thalfingen, Germany, assignor to Licentia Patent-Verwaltungs-G.m.b.H., Frankfurt am Main, Germany Filed Sept. 8, 1971, Ser. No. 178,659
Claims priority, application Germany, Sept. 11, 1970, P 20 44 947.2; July 16, 1971, P 21 35 636.5
Int. Cl. G11c 7/00
U.S. Cl. 340—173 R 9 Claims

ABSTRACT OF THE DISCLOSURE

A matrix memory having the input ends of its column and row conductors and the output ends of its readout conductors provided with delay elements producing respectively different amounts of delay so that the matrix provides a constant delay time between the application of readout signals and the delivery of the resulting information to an amplifier connected to the outputs of the readout conductor delay elements.

BACKGROUND OF THE INVENTION

The present invention relates to a computer memory operating according to the coincidence principle with a matrix-type arrangement of rapidly switching memory elements in which all column and row lines are connected to delay members whose delay period increases from column to column or from row to row, respectively, starting from a common matrix corner, by the amount of time required for a switching pulse to traverse the path between two adjacent crossover points on a line or column, respectively, of the matrix.

A computer memory of the above-mentioned type is described in my U.S. Pat. No. 3,364,475, issued on Jan. 16, 1968. This patent discloses the insertion of a delay member to assure that the coincidence signals arrive simultaneously at the desired crossover points of rows and columns even with extremely high switching speeds for the memory elements and very short coincidence signals. Memory elements with very high switching speeds are constituted, for example, by tunnel diodes or flipflops. Thin magnetic layers and cryotron circuits might also be used for this purpose.

SUMMARY OF THE INVENTION

It is an object of the present invention to substantially increase the operating speed of the known computer memory.

The objects of the present invention are achieved by the provision of a number of readout lines containing additional delay members whose delay periods are so chosen that the total delay, or sum of the delays, is the same for all individual lines for a switching pulse traveling over the associated row or column lines, respectively, and the readout line to an evaluation device (amplifier).

Before discussing the present invention in detail with the aid of the drawings, it should be noted that the desired increase in the operating speed is obtained in that there are achieved so-called "overlapping cycles," which means that during readout as well as during writing in and during mixed operation the respective next-following coincidence signals are fed into the computer memory at a time when the respective preceding coincidence signals are still "en route."

BRIEF DESCIPTION OF THE DRAWINGS

DESCRIPTION OF THE PREFERRED EMBODIMENTS

Figure 1:
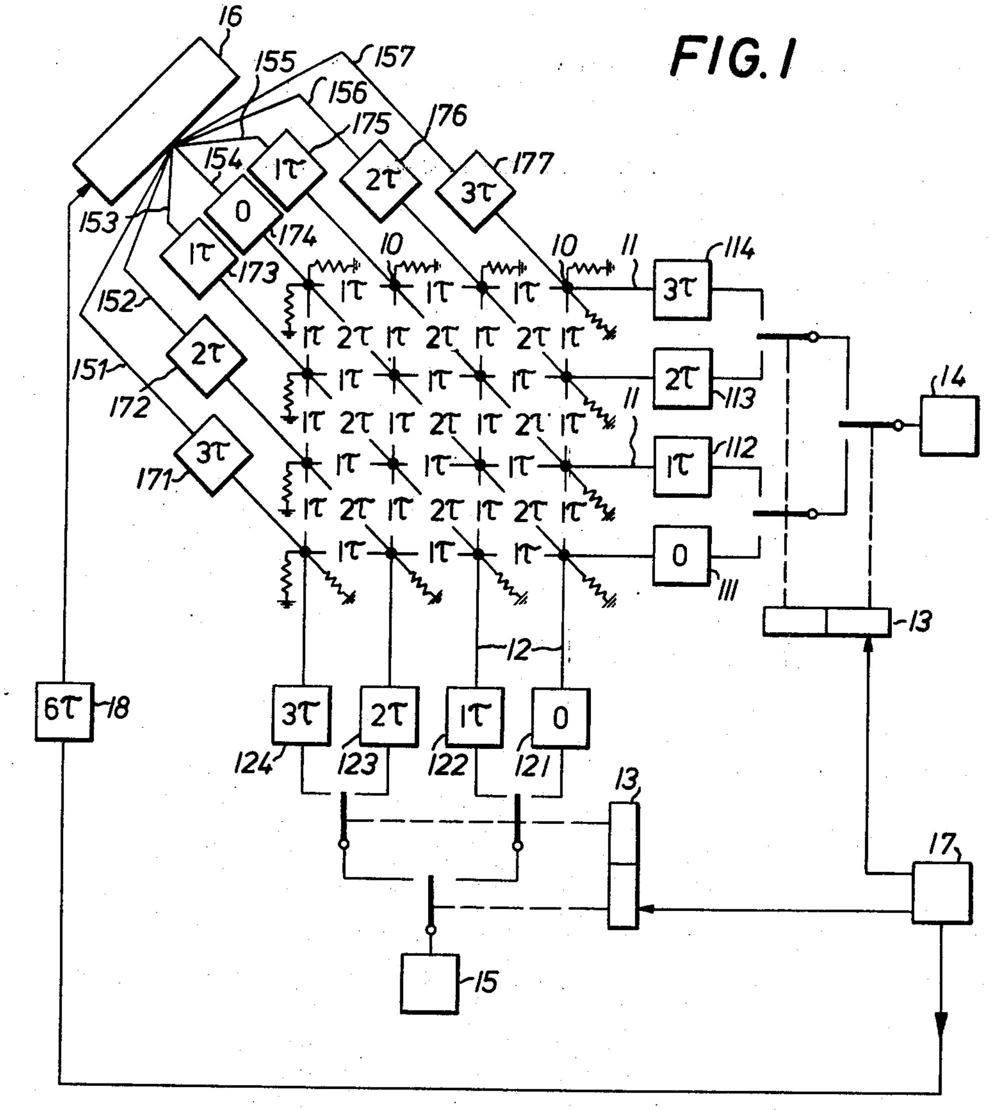
FIG. 1 is a circuit diagram of a first embodiment of a computer memory according to the present invention.

FIG. 1 is a schematic representation of a first embodiment of a computer memory according to the invention. The memory is composed of memory elements 10 linked in a known manner with row lines 11 and column lines 12, each line having one end suitably terminated (matched by resistors). Delay members 111, 112, 113 and 114 are connected at the input ends of the row lines 11, the delay periods of members 111–114 differing in the indicated manner in whole number multiples of a unit delay period $\tau$. Correspondingly, delay members 121, 122, 123 and 124 are connected at the input ends of the column lines 12 and the delay periods of members 121–124 are also dimensioned in the manner mentioned above with regard to members 111–114. The row and column lines are controlled in the manner schematically indicated by switches, the switches being controlled by address registers 13. Coincidence signals are emitted by pulse generators 14 and 15, respectively.

A plurality of parallel readout lines 151, 152, 153, 154, 155, 156 and 157 are provided which pass diagonally through the matrix. The direction of the readout lines is perpendicular to lines which can be drawn through elements with the same delay times for the coincidence signals, these lines being shown as dashed lines.

The readout lines are so designed that their delay periods differ from those of the row and column lines. Assuming that the delay period between two adjacent intersection points for the row and column lines is $\tau$, the delay period between two adjacent intersection points along one of the readout lines 151–157 is made equal to $2\tau$. This deviation in the delay time is preferably effected in that either the readout lines are arranged in a meander pattern or the dielectric material of the readout lines is selected to be different than that of the row and column lines.

The readout lines 151–157 lead to an amplifier 16 for evaluation of the data appearing on the lines. Additional delay members 171, 172, 173, 174, 175, 176 and 177 are connected in the readout lines ahead of the input of amplifier 16, the delay members having the different delay periods indicated in FIG. 1. With these additional delay members it is assured that for any one of the readout lines 151–157 the delay of a pulse from pulse generator 14 or 15 through one of the delay members 111–114 or 121–124, respectively, the respective row and column lines and the readout line with one of the additional delay members 171–177 is the same, and in the illustrated case equals $6\tau$.

In this connection it should be noted that the parts of the row and column lines as well as of the readout lines which are outside of the matrix are considered to have negligible delays in this schematic illustration. If, for example, constant additional delay periods are added anywhere on the path between pulse generators and matrix, this is of no importance for the principle of the circuit according to the present invention.

The above-mentioned uniform delay period, in the illustrated case $6\tau$, has no noticeable adverse effect on the memory operation since it affects all operations in the same way so that the increase in the speed of the operation due to the technique of the invention is not adversely affected.

The total delay is a constant value in that signals transmitted simultaneously from generators 14 and 15 will arrive simultaneously at the intersection point selected by address register 13 and the total delay time from generators 14 and 15 to a selected intersection point and then from that intersection point to the input of amplifier 16 is constant and has a value of $6\tau$.

If with this embodiment information is written in and read out in an irregular sequence, it is necessary to disconnect amplifier 16 during each writing-in operation. For this purpose a control 17 is provided which controls the address register 13 and furnishes a criterion for "write-in" to the amplifier 16. In order to assure that this criterion arrives at the proper moment, a further delay member 18 is provided whose delay period in the illustrated case is again $6\tau$.

Figure 2:
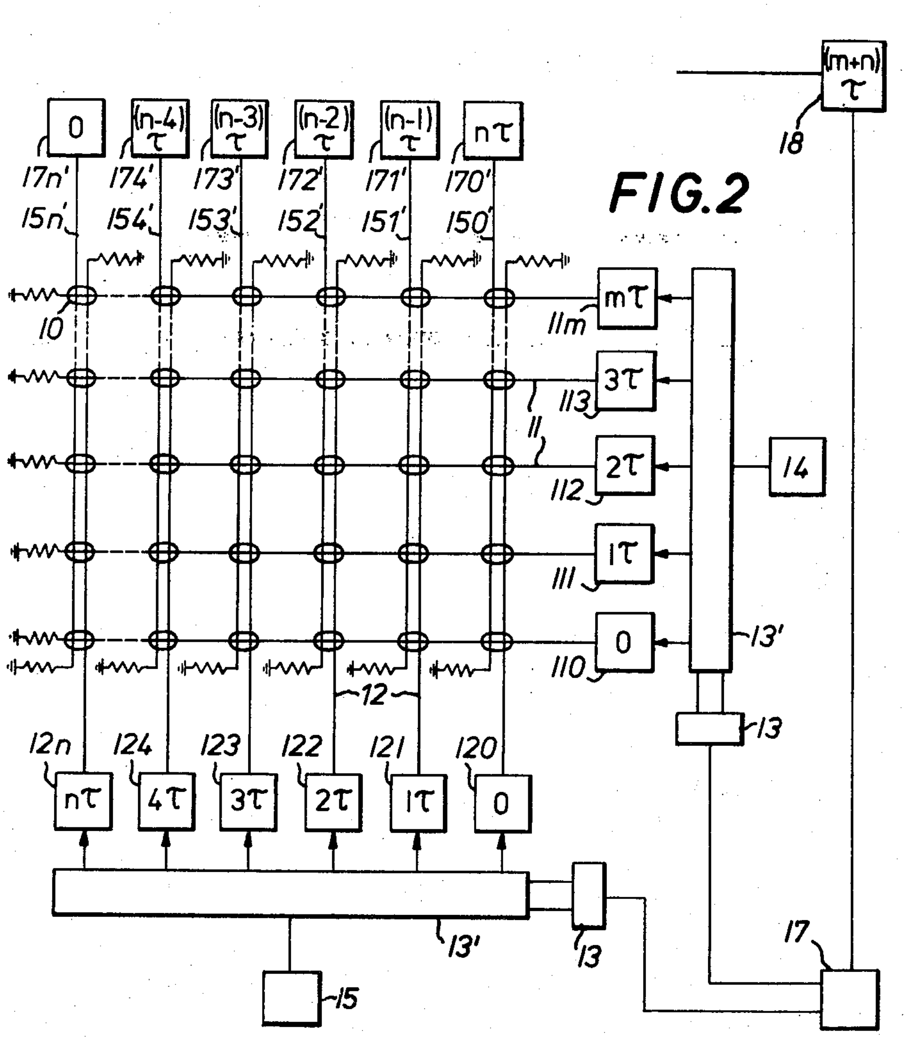
FIG. 2 is a circuit diagram of a second embodiment of a computer memory according to the present invention.

FIG. 2 is a schematic representation of a second embodiment of the computer memory according to the invention. The memory elements 10 are linked in a known manner with $m+1$ row lines 11 and $n+1$ column lines 12, which are suitably terminated at one end. Delay members 110, 111, 112, 113 . . . **11*m* are connected ahead of respective row lines, the delay periods thereof differing in whole number multiples of a delay unit $\tau$ as illustrated, where $\tau$ is the time which a pulse requires to travel over a path between two adjacent memory elements along a given column or row line. Correspondingly, delay members 120, 121, 122, 123, 124 . . . 12*n*** are connected ahead of the column lines and are also dimensioned in the above-described manner.

The row and column lines, respectively, are controlled in the schematically indicated manner by decoding circuits 13′ in turn controlled by address registers 13. Coincidence, or selection signals are emitted by pulse generators 14 and 15. The readout lines 150′, 151′, 152′, 153′, 154′ . . . **15*n*′ of the computer memory shown in FIG. 2 are arranged in parallel with the column lines and each readout line is linked with all of the memory elements of the associated column. The readout lines are so designed that their delay times coincide with those of the row and column lines. Each readout line 150′, 151′ . . . 15*n*′ is connected to a respective additional delay member 170′, 171′, 172′, 173′, 174′ . . . 17*n*′. The outputs of the additional delay members are combined and brought to the input of an amplifier 16**.

The delay times of the additional delay members differ in the manner indicated in FIG. 2 in whole number multiples of the delay time $\tau$ by amounts between 0 and $n\tau$. These additional delay members assure that, for each one of the readout lines, the delay time of a pulse from pulse generator 14 or 15 via one of the delay members 110, . . . , **11*m* or 120, . . . , 12*n***, the respective row or column line and the respective readout line with its additional delay member, is the same, and in the illustrated case is $(m+n)\tau$. The row and column lines as well as the readout lines outside of the matrix in this schematic representation are again considered to have negligible delay times.

The amplifier 16 can be blocked at the proper times via delay member 18 having a delay time $(m+n)\tau$ when the writing signals appear at its input.

Figure 3:
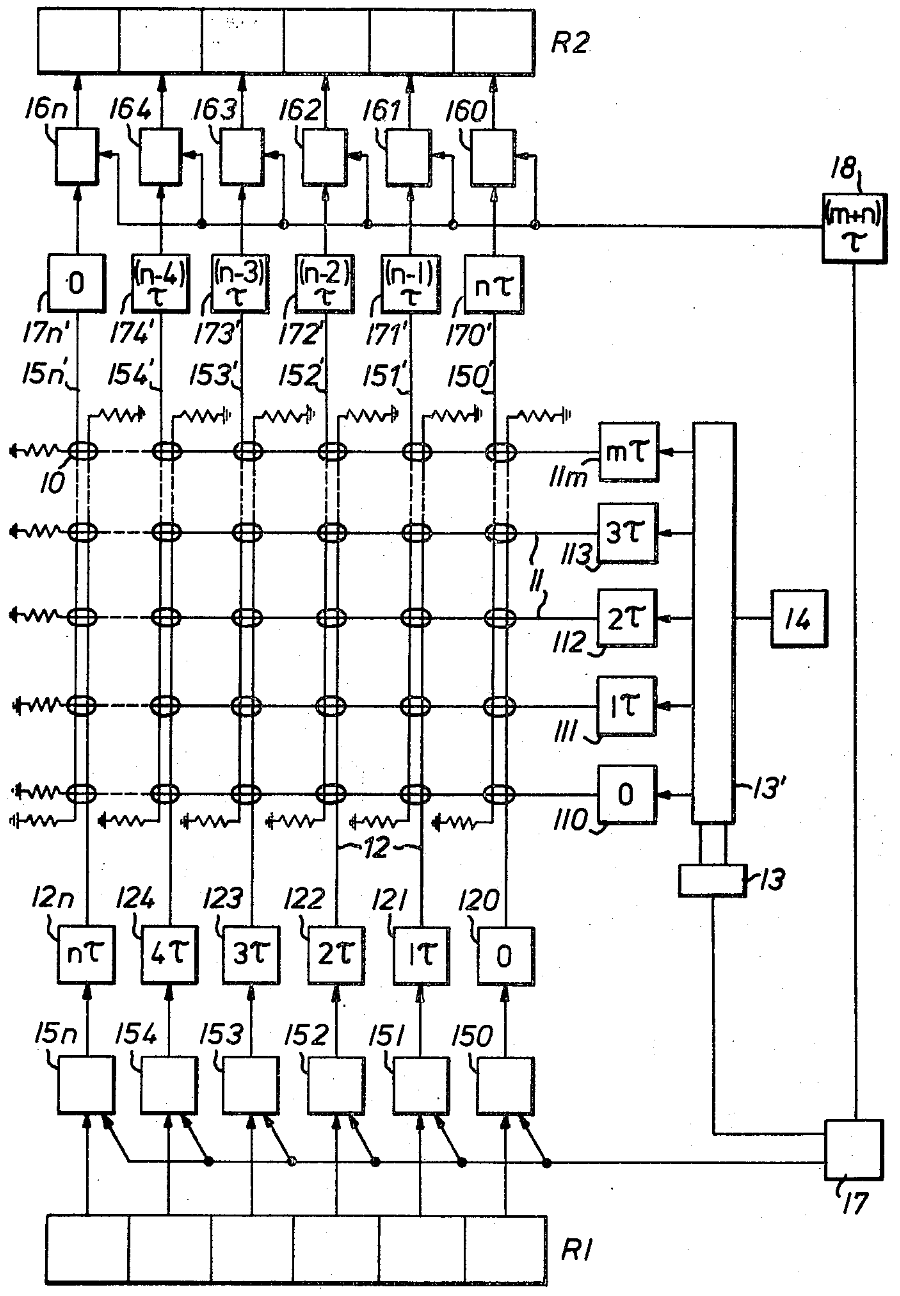
FIG. 3 is a circuit diagram of a third embodiment of a computer memory according to the present invention which is designed for word-oriented operation.

The manner in which the readout lines are arranged in the memory of FIG. 2 makes it possible to use the matrix memory also in a word-oriented memory, FIG. 3 shows such a word-oriented memory. The memory matrix itself, i.e. the relative positions of the row, column and readout lines with respect to the individual memory elements coincides with the arrangement of FIG. 2. The arrangement of FIG. 3 differs from the arrangement of FIG. 2 only in the manner of control of the column lines and in the manner of evaluation of the readout signals.

Since in a word-oriented operation an entire word is written in or read out simultaneously, the arrangement of FIG. 3 provides for a selection pulse to be simultaneously fed to the delay member connected ahead of the row line to be selected as well as to the delay members connected ahead of all of the column lines to select a certain word. This is achieved in FIG. 3 by driving amplifiers 150, 151, 152, 153, 154, . . . **15*n* connected ahead of delay members 120, . . . 12*n*, respectively. Depending on the contents of a write-in register R1**, these amplifiers provide the individual column lines with pulses during a writing-in process.

The delay members connected to the readout lines are here not connected together to the input of a single amplifier, but rather each delay member is connected to an associated reading amplifier 160, 161, 162, 163, 164, . . **16*n* whose output is connected with a respective bit location of a readout register R2. The amplifiers 160–16*n* may be blocked at the proper times during the write-in process by the delay circuit 18**.

Although in the arrangement of FIG. 3 the coincidences between row and column signals occur at different times in the individual memory elements of a selected row, all readout signals appear simultaneously in the individual locations of the readout register R2 and during writing in all of the bits contained in write-in register R1 are simultaneously taken out of the register and fed to the individual delay members **120–12*n***. Thus, it is possible to read out or write in a sequence of words in a much shorter time than corresponds to the time $(m+n)\tau$.

FIGS. 1 to 3 each show only one plane of a computer memory. If the computer memory consists of a plurality of planes, care must be taken, either by structural measures or by means of further delay members, that the memory elements in each plane are controlled simultaneously and that during readout the bits from each plane are simultaneously available.

Figure 5:
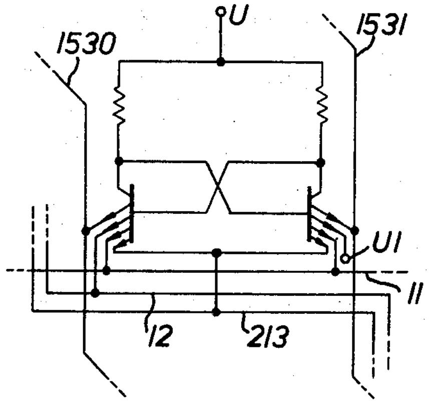
FIG. 5 is a simplified diagram of another embodiment of a computer memory according to the present invention.
Figure 4:
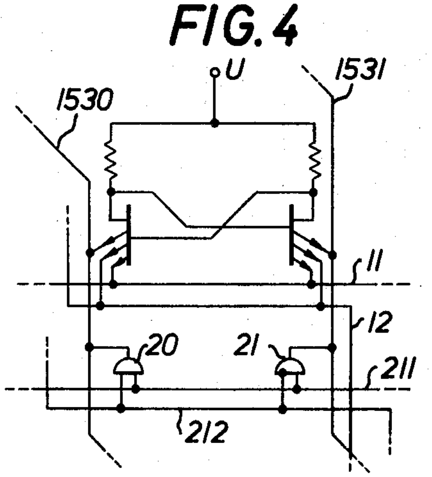
FIG. 4 is a simplified diagram of a further embodiment of a computer memory according to the present invention.

According to an advantageous further embodiment of the present invention an additional line is provided in parallel with each row and/or column line for transmitting control criteria to the memory elements. FIGS. 4 and 5 will serve to illustrate this for arrangements whose memory elements are flipflops.

Although the arrangements of FIGS. 4 and 5 relate to the computer memory of FIG. 1, they can also be used with the computer memories of FIGS. 2 and 3.

In the embodiments described below each one of the readout lines 151–157, arranged as shown in FIG. 1, is designated as a pair of lines, or a double line, the individual lines of each pair being controlled complementarily to one another to take account of the construction of the memory elements. One such readout line pair is shown at 1530 and 1531 in FIGS. 4 and 5. The active semiconductor elements employed in the memory elements are transistors of the type having multiple emitters, as also shown in FIGS. 4 and 5. Such transistors are known in the art (cf. for example, Proc. of the IEEE, December 1964, pp. 1546–1550, especially FIG. 6).

For reasons of simplifying the illustration, only a single memory element having two multiple emitter transistors is shown in each of FIGS. 4 and 5, i.e. an element connected to readout line pair 1530, 1531.

In the embodiment of FIG. 4, one emitter of each transistor is connected to a row line 11 and another emitter of each transistor is connected to a column line 12. Point U is at a potential of, for example, 6 v. Each of lines 11 and 12 has a positive potential of 1 v. when selected, i.e. each illustrated line is at that voltage in the case where coincidence exists for the illustrated memory element. In the rest state, i.e. when not selected, each line is at a negative potential of −6 v.

An additional line 211 in parallel with line 11 and an additional line 212 in parallel with line 12 are provided for applying a signal to the memory element to establish conditions for producing a "write-in" operation. If, for example, a binary "1" is to be written in, line 211 and line 212 each carry a potential which corresponds to the logic value "1." If a binary "0" is to be written in, line 211 carries a potential corresponding to the logic value 1, and line 212 a potential corresponding to a logic 0. Two AND circuits 20 and 21 are provided to permit the correct controlling of the memory element based on the above-mentioned potentials, one input of AND circuit 21 being negated for this purpose.

When writing in a "1," the output of the AND circuit 20 presents a relatively low resistance and is at such a voltage that the uppermost emitter of the left-hand transistor provides a conductive path. The output of the AND circuit 21 then presents a high resistance. When a "0" is being written in, the output of AND circuit 21 presents a low resistance and the output of AND circuit 20 a high resistance. For reading out lines 211 and 212 carry the potentials corresponding to the logic "0."

It is particularly advantageous to have lines 1530 and 1531 in the form of high resistance lines and these lines, in the above-mentioned manner, form a readout line composed of two complementary lines.

FIG. 5 shows another embodiment in which only a single additional line 213, in parallel with line 12, is required and in which no AND circuits are provided. The transistors employed in this case each have four emitters. One emitter of each transistor is connected with line 11 and another emitter of each transistor is connected with line 213. One emitter of the left-hand transistor is connected with line 12, and one emitter of the right-hand transistor is connected to a source of a fixed potential U1. Additionally, one emitter of the left-hand transistor is connected with line 1530 and one emitter of the right-hand transistor is connected with line 1531.

In the illustrated embodiment, point U is assumed to be at a potential of +6 v., and the potential U1 is assumed to be +1 v. Lines 11, 12 and 213 are at a potential of −6 v. in their inactive, or unselected, state. During readout from the illustrated memory element lines 11, 12 and 213 are each at a potential of +1 v. During writing in, when the left-hand transistor shall become conductive the lines 11 and 213 have a potential of +1 v. and line 12 has a potential of −6 v. When the right-hand transistor shall become conductive the lines 11, 12 and 213 are each at a potential of +2 v.

It might again be mentioned that particularly the potentials which are different from the potential corresponding to the inactive state appear as relatively short pulses which travel through lines 11, 12, 211, 212, 213 of the arrangements of FIGS. 4 and 5 and arrive in coincidence at the selected memory elements.

It depends on the individual case which one of the embodiments should be employed. In the circuit of FIG. 4 the passing coincidence pulses will encounter a low capacitive load, for example when Schottky diodes are used for the AND gates 20 and 21. In the circuit of FIG. 5 there is presented more the case of a constant load. In the latter case, suitable dimensioning must be provided for the lines so that no interfering reflections can occur.

It will be understood that the above description of the present invention is susceptible to various modifications, changes and adaptations, and the same are intended to be comprehended within the meaning and range of equivalents of the appended claims.

I claim:

1. In a computer memory operating according to the coincidence principle and including a matrix-type array of rapidly switching memory elements, row and column lines interconnecting the memory elements, a respective delay member connected at the input end of each row and column line, the delay time of each member being greater than that of the adjacent member from column to column or from row to row, respectively, starting from a common corner of the matrix, by the amount of time required for a switching pulse to traverse the path between two adjacent intersection points and a plurality of readout lines each associated with at least one memory element, the improvement comprising: a plurality of additional delay members each connected to the output end of a respective one of said readout lines, the delay times of said additional members being so dimensioned that for all of said row, column and readout lines and their associated delay members, the sum of the time delays which a pulse encounters on the path through any one said delay member, over the row or column line connected to that delay member, over the selected readout line, and through its associated additional delay member to an evaluation device has a constant value.

2. An arrangement as defined in claim 1 wherein said readout lines are arranged in the computer memory substantially perpendicularly to lines of the same delay times of the coincidence signals, all said readout lines having a time delay behavior such that the pulse delay time between two adjacent intersection points with memory elements along that readout line is twice as long as the pulse delay time between two adjacent intersection points along a row or column of said matrix-type array.

3. An arrangement as defined in claim 1 wherein each said readout line is associated with the memory elements of one column of said matrix-type array, and all said readout lines have a time delay behavior such that the pulse delay time along each said readout line between two adjacent memory elements is equal to the pulse delay time in the associated column line between the same two memory elements.

4. An arrangement as defined in claim 1 further comprising an evaluation device having an input connected to the outputs of all of said additional delay members.

5. An arrangement as defined in claim 1 further comprising a plurality of evaluation devices each having an input connected to the output of a respective one of said additional delay members.

6. An arrangement as defined in claim 5 further comprising means connected for simultaneously feeding a selection pulse to the input of a delay member of a selected row line and to the inputs of the delay members of a plurality of said column lines.

7. An arrangement as defined in claim 1 wherein each said memory element is constituted by a flipflop.

8. An arrangement as defined in claim 1 further comprising a plurality of additional lines connected in parallel with at least one of said row and column lines for transmitting control signals to said memory elements.

9. An arrangement as defined in claim 8 wherein said additional lines are combined into a plane which is parallel to the plane defined by said matrix-type array.

References Cited

UNITED STATES PATENTS

| | | | |
|---|---|---|---|
| 3,364,475 | 1/1968 | Hilberg | 340—174 VB |
| 3,414,890 | 12/1968 | Schwartz | 340—174 VB |

TERRELL W. FEARS, Primary Examiner

U.S. Cl. X.R.

340—173 RC, 174 VB